(12) United States Patent
Sollo

(10) Patent No.: US 6,536,603 B1
(45) Date of Patent: Mar. 25, 2003

(54) POT HAVING A LID

(75) Inventor: Giovanni Sollo, Casoria (IT)

(73) Assignee: Societa Italiana Pentole S.p.A. (IT)

( * ) Notice: Subject to any disclaimer, the term of this patent is extended or adjusted under 35 U.S.C. 154(b) by 0 days.

(21) Appl. No.: 09/890,682

(22) PCT Filed: Feb. 5, 1999

(86) PCT No.: PCT/IT99/00042
§ 371 (c)(1),
(2), (4) Date: Feb. 21, 2002

(87) PCT Pub. No.: WO00/45687
PCT Pub. Date: Aug. 10, 2000

(51) Int. Cl.[7] .............................. A23L 1/00; A47J 27/00; A47J 27/06; A47J 36/08
(52) U.S. Cl. .................... 210/469; 210/464; 99/403; 99/410; 220/912
(58) Field of Search .................... 99/337, 339, 340, 99/403, 410–417, 495; 210/464, 465, 469, 287, 239; 220/300, 324, 367.1, 254.1, 254.4, 912, 316, 245; 222/557; 126/384.1; 209/281; D7/391, 538

(56) References Cited

U.S. PATENT DOCUMENTS

| 1,328,558 A | * | 1/1920 | Brooks | 210/469 |
| 1,997,509 A | * | 4/1935 | Betteridge et al. | 220/300 X |
| 2,385,594 A | * | 9/1945 | Witte, Jr. | 126/384.1 |
| 2,541,094 A | * | 2/1951 | Pesenti | 126/384.1 X |
| 2,907,467 A | * | 10/1959 | Machate, Jr. | 220/367.1 |
| 3,065,855 A | * | 11/1962 | Edwards | 220/324 X |
| 5,730,045 A | * | 3/1998 | Delaquis et al. | 99/337 |

FOREIGN PATENT DOCUMENTS

| GB | 231024 | * | 4/1925 |
| GB | 304971 | * | 2/1929 |

* cited by examiner

Primary Examiner—Timothy F. Simone
(74) Attorney, Agent, or Firm—Leffert Jay & Polglaze, P.A.

(57) ABSTRACT

A pot having a lid for cooking and draining food includes a lid (2) having an outer convex top (20), with a central knob (21), which is dome-shaped and perforated by a plurality of through apertures (25,26) in one sector thereof, extending within one half of the top (20). The lid (2) further includes an edge (22) and a leaning swell (23) for leaning onto an upper brim (10) of the pot (1), which extends with a cylindrical band (24) for the reciprocal sliding coupling of the lid (2) with a mouth (11) of the pot (1), the cylindrical band (24) having an outer diameter smaller than the inner diameter of the mouth (11) so as to accomplish a substantially airtight coupling when one is inserted into the other. The lid (2) is provided with releasable engagement means for the fast locking of the lid (2) on the pot (1) at the cylindrical band (24) of the lid (2) and in the mouth (11).

8 Claims, 2 Drawing Sheets

POT HAVING A LID

This application is a 371 of PCT/IT 99/00042, filed Feb. 05, 1999.

FIELD OF THE INVENTION

The present invention relates to a pot having a lid for cooking food, in particular for the boiling and for the subsequent draining of the cooking liquid thereof.

BACKGROUND

It is known that the preparation of cooked food like pasta, boiled vegetables and others, involving boiling for example in water, requires a subsequent draining in order to separate the cooking liquid, which is still hot, from the boiled food.

The draining is usually carried out by means of tools or kitchenware such as colanders, sieves of various size or the like.

However, said process involves risks for the person carrying them and people nearby, considering the high temperature which often has the cooking liquid at the moment of draining.

Furthermore, food morsels may break as they are dropped from the pot into the draining utensil.

At the end, the draining utensil must be washed, and the washing thereof is difficult because of the leftovers stuck in the holes thereof.

Various solutions of the problems related with the known draining utensils are known. One solution is the use of a sort of small crate that has to remain inside the pot while the food is cooking, and that enables the draining thereof by simply lifting off the crate from the pot. The use of the crate, when it is used as a actual colander having solid walls with a plurality of holes, requires that the cooking is performed with a larger quantity of water, filling the gap between the pot and the crate.

Moreover, the presence of a further wall and of a gap of limited width filled with water forces the pot to absorb a remarkable quantity of heat in order to carry out the cooking, with subsequent higher power consumption due to longer cooking times.

On the other hand, when the crate is substantially made of a wire net, the latter requires a difficult and careful washing after use due to the leftovers which may stick to the meshes of said net, and in any case it represents a third element in addition to the pot the lid thereof.

Another known solution to the above-mentioned problems is represented by accessories which can be attached to the pots, i.e. perforated screens to be attached to the inner brim of the pot, possibly provided with manually operated fastening means.

This kind of utensil is used once the lid has been removed, and make up a perforated barrier against the passage of the solid foodstuff contained in the pot, allowing flowing of the cooking liquid.

This kind of utensil is sufficiently effective per se, but it does not represent a solution because it represents an additional utensil to be used and then washed, just like a colander.

Furthermore, such perforated screens are usually made of plastics which, eventually, are subject to deterioration or to plastic deformation which is detrimental to their use.

Moreover, said perforated screens are attached to the pot when it is filled up with hot and steaming liquid, with the subsequent risk of scalding. A similar risk is run during the draining, which must be slow and careful in order to avoid an uncontrolled spilling of the boiling cooking liquid or a sudden detachment of the screen.

A further known solution provides a substantially flat lid which can be hooked and locked at the outer peripheral rims which are part of the body of the pot.

The surface of said known lid slants toward a cylindrical perforated portion of the peripheral edge thereof, which creates passage ways for the cooking liquid.

Such lid, because of its flat shape, has an easily deformable structure, and it does not offer a sufficient resistance to the bending determined by the weight of the cooking liquid which, during the draining, leans its weight against the inner surface of the lid.

Therefore, this kind of hooking becomes eventually ineffective. Moreover, the acute angle formed by the flat surface of the lid and the cylindrical portion of the pot creates a sort of groove wherein the solid foodstuff accumulates, hindering the steady outflow of the cooking liquid. Eventually, said groove is difficult to clean.

U.S. Pat. No. 1,328,558 (Brooks) discloses a pot and a lid wherein the latter is not tightly fitted into the mouth of the pan just at the edge portion where the draining takes place.

GB 231,024 (Forse) discloses a cooking utensil wherein hot water may escape from the mouth edge of a pan at the draining area thereof.

U.S. Pat. No. 1,997,509 (Betteridge et al.) shows another cooking utensil wherein a lid may be pulled of from the mouth of a pan by draining, due to the weight of the hot water.

GB 304,971 (Walker Jones) and U.S. Pat. No. 5,370,045 (Delaquis et al.) disclose pans wherein small apertures are provided on limited surface at the edge of the lid only.

SUMMARY

The technical problem which underlies the present invention is to provide a pot lid that overcomes the drawbacks mentioned with reference to the prior art.

Said problem is solved by a pot having a lid as above specified, comprising a lid having:
- an outer convex top, with a central knob, which is dome-shaped and perforated by a plurality of through apertures in one sector thereof, extending within one half of said top;
- an edge and a leaning swell for leaning onto an upper brim of the pot, which extends with a cylindrical band for the reciprocal sliding coupling of the lid with a mouth of the pot, said cylindrical band having an outer diameter smaller than the inner diameter of the mouth so as to accomplish a substantially airtight coupling when one is inserted into the other;

and provided with releasable engagement means for the fast locking of said lid on said pot at said cylindrical band of the lid and in said mouth.

The pot having a lid according to the present invention complies with the object to allow an optimum boiling and draining of the food without the need of adding additional tools or utensils into the pot-and-lid as a whole.

Another aim attained by the present invention is that of allowing an easy boiling and draining, free from the usual risks connected with such operations.

A further advantage of said pot having a lid is that of making up a set, corresponding in its structure to the known pots with lids as a whole, without the addition of auxiliary means or elements and without the need for parts made of synthetic material or in any case from material different from the basic material of the pot having a lid, which may therefore be manufactured inexpensively and last for a long time.

Another of the advantages obtained by the present invention consists essentially in that also the boiling operation is improved by the above illustrated pot having a lid.

In fact, the presence of small apertures over a section of the lid allows, during the cooking of food, a controlled steam release. This makes it possible to continue the cooking, after the boiling starts, without having to remove the lid or to move the lid sideways in an unstable position or lay it on makeshift supporting means, such as a ladle leaning sidelong the pot, for fear of a dangerous overflow of the boiling liquid which could furthermore imply the extinction of the burner, when the latter is of the free flame kind.

Furthermore, an accidental fall of the pot according to the invention, if closed with its lid in the locked position, will be susceptible of causing much less damage compared to a common pot, as the spill of the boiling liquid from the holes in the lid is definitely limited both in its quantity and in its sprinkling range.

Further characteristics of the present invention will hereinafter result from the description of some preferred embodiments thereof, shown as a non-limiting examples with reference to the figures of the annexed drawings.

DETAILED DESCRIPTION

Figure 1:
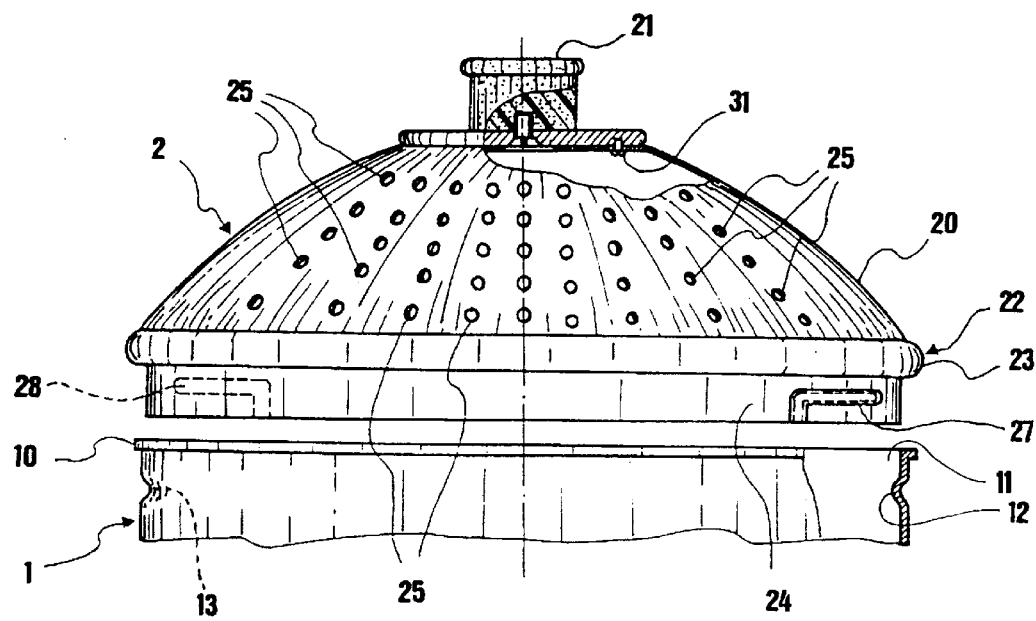
FIG. 1 shows a partial side view, partially in cross section, of a pot having a lid according to the present invention.

With reference to the figures, the pot is indicated 1, and 2 the respective lid thereof, apt to be placed on the mouth 11 of the latter to close the pot.

The lid 2 is provided with an outer convex top 20 with a central knob 21 and an edge 22. The edge 22 of the lid 2 has a peripheral swell 23 and extends with a cylindrical band 24 which projects toward the pot.

The swell 23 operates as a leaning on an upper brim 10 of the pot 1. The cylindrical band 24 helps the coupling, with a free reciprocal sliding, between the mouth 11 of the pot 1 and the lid 2, as the outer diameter of the band 24 is slightly smaller than the inner diameter of the mouth 11.

The band 24 and the mouth 11 accomplish a substantially airtight coupling when one is inserted into the other.

According to the present embodiment, the lid top 20 of the lid is dome-shaped, i.e., it is provided with an evident outer convexity. Moreover, the top 20 is perforated by a plurality of small through apertures placed over a surface identified by a sector of the top itself which extends altogether within one half of said top.

Figure 2:
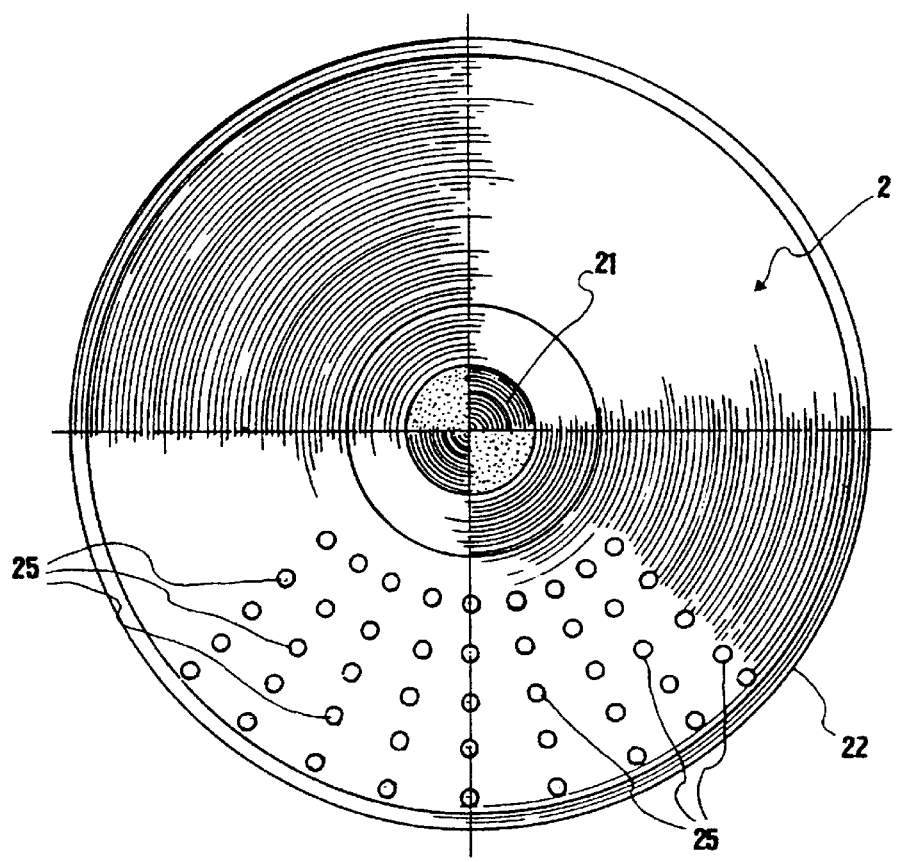
FIG. 2 shows a plan top view of the pot having a lid of FIG. 1.
Figure 3:
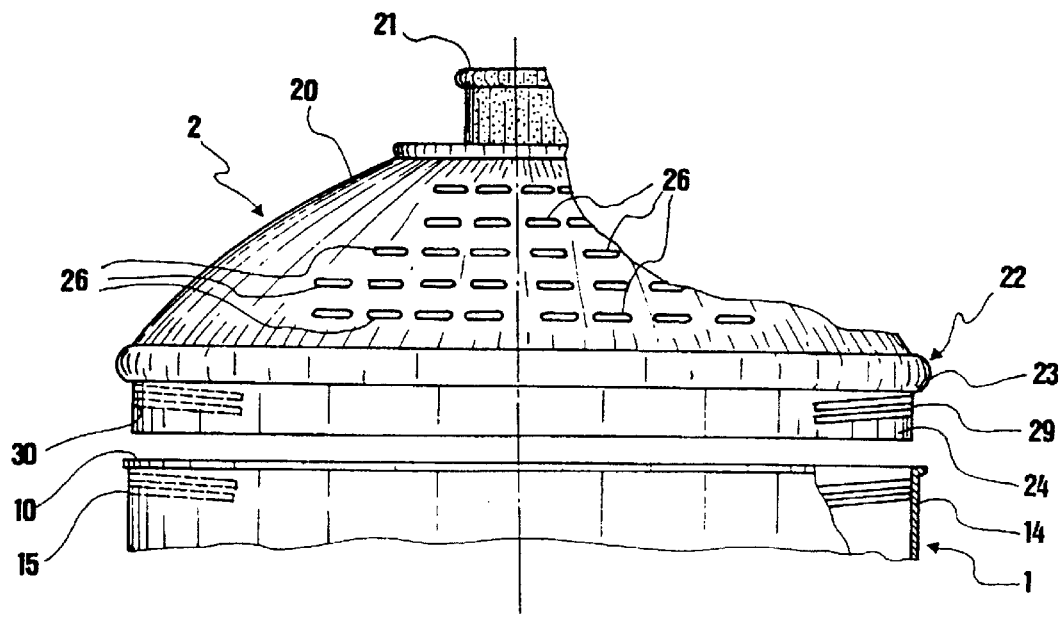
FIG. 3 shows a partial side view, partially in cross section, of a pot having a lid according to an equivalent embodiment of the present invention.

Such through apertures can be shaped as holes 25, as shown in FIGS. 1 and 2, or as elongated slots indicated 26 (FIG. 3).

The diameter of the holes 25 and the size of the slots 26 are conveniently chosen, and smaller with respect to the size of the foods which are cooked by boiling and which must subsequently be drained.

Figure 4:
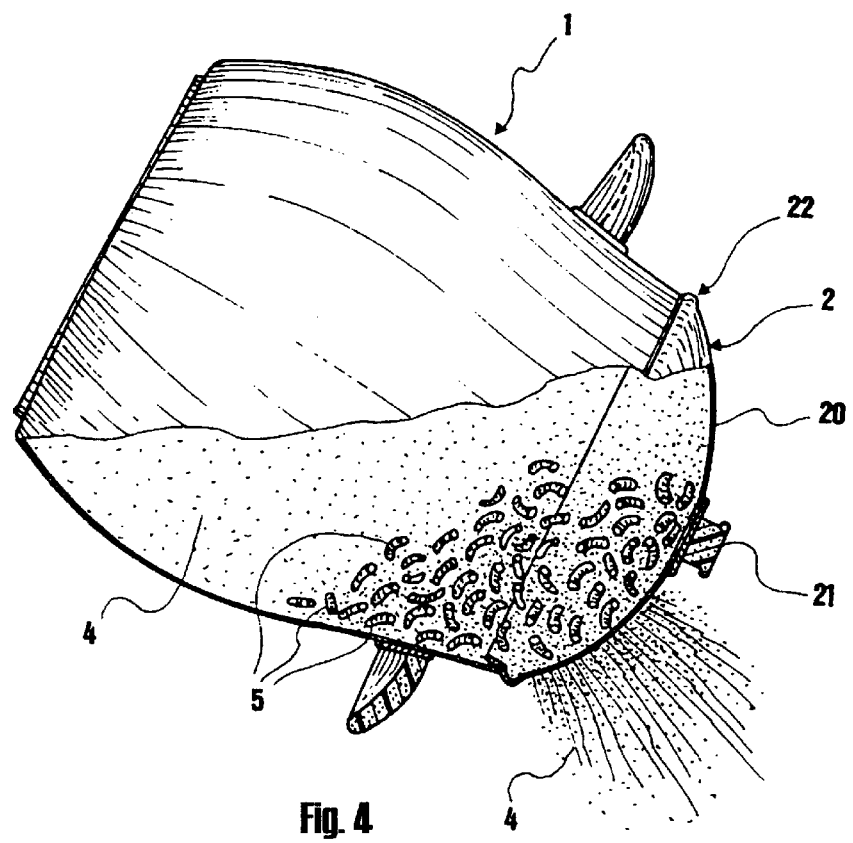
FIG. 4 shows a schematic side view of the pot having a lid of the preceding figures, in a step of draining.

The extension of the sector of the top 20 having the through apertures can be chosen of the desired sizes but obviously it is convenient that does not exceed the center line, i.e., exceeding the knob 21, to avoid scalds due to an irregular outflow of the boiling liquid (FIG. 4) from the pot.

Still according to the present embodiment, at the cylindrical band 24 of the lid and of the mouth 11 of the pot 1, releasable engagement means are provided for the fast locking of the lid 2 on the pot 1.

As shown in FIG. 1, in a first embodiment such engagement means are substantially of the bayonet type. In case of need, the pot 1 has, at its mouth 11, at least two inner diametral projections 12, 13 and, on the band 24 of the lid 2, at least one pair of opposed grooved recesses 27, 28 for example L-shaped, intended to receive and hold the two respective diametral projections 12, 13.

The two inner projections 12, 13 can for example be obtained by punching the pot 1. As an alternative, the two projections 12, 13 can be obtained by means of a pair of opposed pins (not shown) inserted in the same position of the rim of the mouth 11.

The pot 1 and the lid 2 can, according to a different embodiment, involve releasable engagement means of the screw type (FIG. 3). To this purpose the pot 1 has, at its mouth 11, at least one or preferably two opposed sections of inner thread 14,15 while the lid 2 has on its cylindrical band 24 respective sections of internal thread 29, 30, intended to engage with the corresponding sections of inner thread 14, 15 of the mouth 11.

In order to allow the locking between the pot 1 and the lid 2 it is necessary, contrary to what happens with the common lids, after an orientated insertion, to operate a limited rotation of the lid 2 with respect to the pot 1.

Therefore it is convenient, as shown in FIG. 1, that the central knob 21 is advantageously secured in a fixed manner to the top 20 at at least 2 points, which can be represented, by way of example, by a dowel 31 inserted into a corresponding hole of the top 20, and a fastening screw 32, passing through the top 20 of the lid and screwed to the handle 21.

The pot having a lid according to the present invention can be used for boiling or cooking with the lid 2 leaning on the pot 1 or, better, locked thereto by means of the above-described engagement means, in order to obtain the above mentioned advantages, of heat saving, less time wasted and greater safety deriving from the fact that the contents of the pot will not spill in case of fall.

During the draining (FIG. 4), the water or other cooking liquid, indicated 4, flows out, with the lid 2 locked to the pot 1, through the through apertures 25 or 26 of the same lid.

The solid food morsels, indicated 5, for example macaroni, are held by the lid 2 without blocking the through apertures 25, 26, since they are distributed onto the inner concavity of the lid 2 and can be easily let to slide along the curve of the latter by gentle undulating motions.

The invention conceived as set forth above is subject to various modifications and variations, all of them falling within the scope of the same invention. Furthermore, all the details can be replaced by technically equivalent elements.

Modifications and/or improvements are of course possible in practice, all of them however falling within the scope of the claims annexed hereinafter.

What is claimed is:

1. A pot having a lid for cooking and draining food, comprising a lid (2) having:

an outer convex top (20), with a central knob (21), which is dome-shaped and perforated by a plurality of through apertures (25,26) in one sector thereof, extending within one half of the top (20); and an edge (22) and a swell (23) for leaning onto an upper brim (10) of the pot (1), which extends with a cylindrical band (24) for the reciprocal sliding coupling of the lid (2) with a mouth (11) of the pot (1), the cylindrical band (24) having an outer diameter smaller than the inner diameter of the mouth (11), wherein the cylindrical band (24) and the mouth (11) accomplish a substantially airtight coupling when the cylindrical band (24) is inserted into the mouth (11);

wherein the pot (1) and the lid (2) are provided with releasable engagement means for locking of the lid (2) on the pot (1) at the cylindrical band (24) of the lid (2) and in the mouth (11).

2. The pot having a lid according to claim 1, wherein the releasable engagement means are of the bayonet type, the pot (1) having at least two inner projections (12,13) on the mouth (11) and the lid (2) having at least one corresponding pair of opposed grooved recesses (27,28), formed in the cylindrical band (24), intended for engaging and holding, respectively, the at least two inner projections (12,13).

3. The pot having a lid according to claim 2, wherein the inner projections (12,13) are formed by punching.

4. The pot having a lid according to claim 2, wherein the inner projections (12,13) consist of a pair of opposed pins inserted in the mouth (11).

5. The pot having a lid according to claim 1, wherein the releasable engagement means are of a screw type.

6. The pot having a lid according to claim 1, wherein the through apertures (25,26) are holes (25).

7. The pot having a lid according to claim 1, wherein the through apertures (25,26) are elongated slots (26).

8. The pot having a lid according to claim 1, wherein the central knob (21) is secured to the lid.

\* \* \* \* \*